United States Patent
Le et al.

(10) Patent No.: US 8,788,825 B1
(45) Date of Patent: Jul. 22, 2014

(54) METHOD AND APPARATUS FOR KEY MANAGEMENT FOR VARIOUS DEVICE-SERVER CONFIGURATIONS

(75) Inventors: An Van Le, San Jose, CA (US); Andrea Maria Mazzario, Koloa, HI (US); Elliot Schwartz, San Francisco, CA (US)

(73) Assignee: Digi International Inc., Minnetonka, MN (US)

( * ) Notice: Subject to any disclaimer, the term of this patent is extended or adjusted under 35 U.S.C. 154(b) by 1820 days.

(21) Appl. No.: 10/342,868

(22) Filed: Jan. 14, 2003

(51) Int. Cl.
  *H04L 29/06* (2006.01)
  *H04L 9/08* (2006.01)

(52) U.S. Cl.
  CPC .................................. *H04L 9/0819* (2013.01)
  USPC ........................................ 713/171; 380/277

(58) Field of Classification Search
  USPC .......................................................... 380/279
  See application file for complete search history.

(56) References Cited

U.S. PATENT DOCUMENTS

| | | | |
|---|---|---|---|
| 6,226,752 B1 * | 5/2001 | Gupta et al. ..................... 726/9 |
| 6,480,957 B1 * | 11/2002 | Liao et al. ..................... 713/170 |
| 6,757,825 B1 * | 6/2004 | MacKenzie et al. .......... 713/169 |
| 2001/0020274 A1 * | 9/2001 | Shambroom ................... 713/201 |
| 2002/0126846 A1 * | 9/2002 | Multerer et al. ............... 380/251 |
| 2003/0079143 A1 * | 4/2003 | Mikel et al. ..................... 713/200 |
| 2003/0217288 A1 * | 11/2003 | Guo et al. ....................... 713/201 |
| 2003/0226017 A1 * | 12/2003 | Palekar et al. ................. 713/168 |
| 2003/0229789 A1 * | 12/2003 | Morais et al. .................. 713/171 |
| 2004/0015689 A1 * | 1/2004 | Billhartz ......................... 713/156 |

OTHER PUBLICATIONS

Microsoft Computer Dictionary 2002 Microsoft Press definition of "key".*
William Stallings, Ph.D., *Network and Internetwork Security Principles and Practice*, IEEE Press, Chapter 8, Authentication and Key Exchange, (pp. 314-359) Prentice-Hall, Inc. 1995.

* cited by examiner

*Primary Examiner* — David Pearson
(74) *Attorney, Agent, or Firm* — Heimlich Law, PC; Alan Heimlich, Esq.

(57) ABSTRACT

A first entity initiates a first connection to a second entity which then receives from the second entity initial information which the first entity uses to derive a key for the first entity (first entity key). The first entity key is then used to authenticate the second entity and if the second entity is authenticated then the first entity derives a second key which is used for communication between the first entity and the second entity.

5 Claims, 7 Drawing Sheets

Configuration 2

Connection is initiated by the device or by the DMS.

Configuration 4

A common implementation for various configurations in which the connection is initiated by the device, the DMS, or the DAS, and the DMS sends the DAS the session key Ks.

METHOD AND APPARATUS FOR KEY MANAGEMENT FOR VARIOUS DEVICE-SERVER CONFIGURATIONS

FIELD OF THE INVENTION

The present invention pertains to devices connected to a network. More particularly, the present invention relates to a method and apparatus for key management for various device-server configurations.

BACKGROUND OF THE INVENTION

Key management in a device-server environment is important for a variety of reasons. One such reason is using a key to establish a secure or more trusted communications link.

One older key distribution approach is Kerboros. In Kerboros, there is a server, referred to as the Authentication server, dedicated to authenticating users or clients for other servers on the network. Kerboros is based on DES, a symmetric encryption algorithm, for key distribution. In Kerboros, the Authentication server is the central server that performs all the cryptographic authentication of clients. Performing all cryptographic authentication on a single or small number of Authentication servers may present problems for device-server configurations having many devices.

BRIEF DESCRIPTION OF THE DRAWINGS

The invention is illustrated by way of example and not limitation in the figures of the accompanying drawings in which.

DETAILED DESCRIPTION

A method and apparatus for key management for various device-server configurations are described.

In one embodiment of the invention are described methods and apparatuses to distribute keys from a Device Management Server (DMS) to a Device Application Server (DAS), to allow the DAS to establish a secure session with devices that belong to the same network, or that it serves. The Device Management Server is a server for managing the Internet devices or appliances. The Device Application Server is a server for managing applications related to the Internet devices or appliances. There are situations where the functionality of the DAS and DMS may be on a single sever and there are other situations where it may be desirable to have the DAS and DMS on separate servers. In one embodiment of the invention, the DAS has a lesser or simpler capability than the DMS, and may be configured in various ways. For example, in one configuration, a DAS for security reasons may not store key(s), or a DAS may lack a database to store key(s), that would enable it to communicate with devices that it services. This type of DAS is referred to as a zero-admin DAS (ZAD). Yet, in another configuration, the DAS is configured as a ZAD, but together with other ZADs in the network, it forms a cluster. In another configuration, the DAS has access to a database, but for security reasons, it is not authorized to store keys in the database. In these various configurations, approaches are needed to securely distribute keys from the DMS to the DAS, so that it can securely communicate with device(s) that connect to it and/or that it services.

While the DMS in the present disclosure may act as an Authentication server, for example, to authenticate a device on behalf of the DAS, it is to be understood that the DMS is not limited to this function alone, for example, the DMS may be configured to play the role of a key distribution center (KDC). Furthermore, the key management mechanisms utilized in the invention may use various encryption algorithms, such as public key cryptography for the distribution of device keys. Additionally, the DMS may be configured to perform only part of the cryptographic operations, that is, other servers such as the DAS may also perform authentications of the device. This makes it possible to perform load-balancing for networks with a large number of devices. What is to be appreciated is that the invention is not limited to only the specific scenarios and/or configurations discussed.

In the explanation below various terminology is used. These are understood by those of ordinary skill in the art. For the benefit of the reader the following should be noted. To provide a concise illustration of the present invention the context of the description will often refer to connecting machines or devices to a network. One of ordinary skill in the art will appreciate that the Internet is but one example of a network and that the present invention may be practiced with other networks. Additionally, the use of the phrase "entity A uses key X to communicate with entity B" or similar language is to be understood as a shorthand notation for "entity A and entity B use key X to establish a secure session. As part of the establishment of a secure session, A and B mutually authenticate each other and derive a shared session key."

In the embodiments of the present invention, a device or a server may initiate a connection. If the device initiates a connection, the connection is referred to as device-initiated connection. If the server initiates a connection, the connection is referred to as a server-initiated connection.

Figure 3:
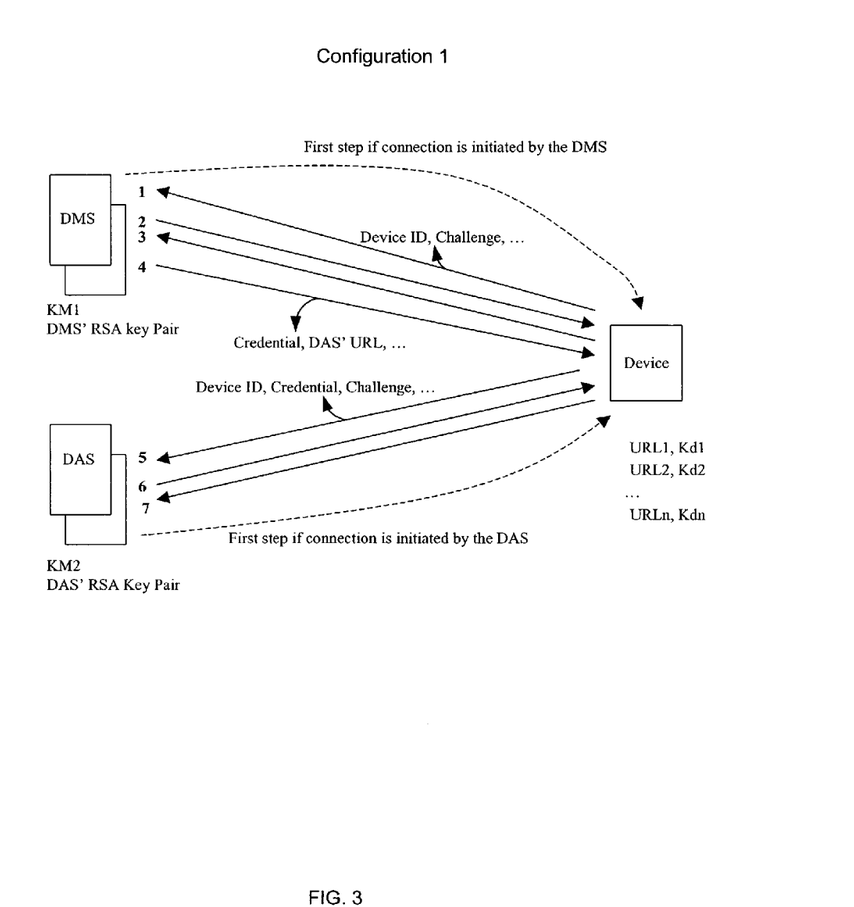
FIGS. 3, 4, 5, 6, and 7 illustrate various embodiments of configurations of the invention.

FIG. 3 illustrates one embodiment of the present invention denoted as Configuration 1. FIG. 3 depicts a diagram of messages exchanged between the device and the DMS, and the device and the DAS, assuming there is no direct connection between the DMS and the DAS. Note that the dotted message flow denotes a message sent by the DMS (or DAS) in a server-initiated connection.

The DMS and its cluster have a symmetric master key, denoted KM1, which is stored in the DMS's database. This master key is used for secure authentication and communication between the DMS and the device.

Those skilled in the art will appreciate that there are ways for the server and the devices to "share" a key for the purpose of secure authentication and communication. For example, each device may have its own symmetric key, so that if the security of a device is compromised, the security of other devices is not affected. The server may store the symmetric key of all the devices. Alternately, the server may need to store only one master key, and when needed, the server may derive the symmetric key of a device based on a one-way function of the master key and a unique identifier of the device (e.g. a device ID). Each approach has its own advantages and disadvantages. The second approach requires less storage, as only the master key needs to be stored in non-volatile storage. However, if the server is compromised at some point, the symmetric key of all devices, including future devices, will be compromised.

The device has its own symmetric key—referred to as the device key—that it uses to communicate with the DMS. When a device establishes a session with the DMS, it presents its device ID. Based on the device ID and KM1, the DMS dynamically derives a corresponding key that has the same value as that of the device key, to establish a secure session with the device (if a secure session is called for by the application). As part of the establishment of a secure session, the server and the device mutually authenticate each other, and derive a shared symmetric session key Ks that is used for encrypting and decrypting exchanged data. This is represented by message flows 1-3 in FIG. 3. When the session ends, the session key Ks is no longer valid for the next secure session.

In FIG. 3, the device may contain several device keys, to communicate with various servers. For example, Kd1 is used to communicate with the DMS and its cluster, Kd2 is used to communicate with a certain DAS and its cluster, etc. The selection of an appropriate key to use may be based on the identity of the server, for example, the URL. Thus, each entry for a key stored in the device's non-volatile storage could contain the index (e.g., the URL or a 16-byte hash value of the URL) and the value of the device key. Additionally other information may be stored as well, for example, a checksum for the key. The number of keys stored on each device is limited by the non-volatile storage capacity of the devices being deployed and the security considerations.

The DAS may have persistent local storage to contain its own Master key KM2, which it uses to communicate with the device. KM2 can be made to be the same as KM1 (the Master key of the DMS), if the storage of the device is limited. However, a higher level of security may be achieved if KM1 and KM2 are different, so that sensitive communication between the DMS and the device, and between the DAS and the device, can remain private to the respective participants.

In the event that KM2 is the same as KM1, it may not be desirable to install KM1 at the DAS. This is because the DAS may be perceived to have less physical security protection than the DMS; if security at the DAS is exposed, an adversary may compromise the value of KM1 without attacking the DMS. In one embodiment KM1 is not installed at the DAS. Instead, the DMS generates a set of device keys from KM1 and the device IDs of the set of devices that the DAS governs. This generated set of device keys is then replicated to the DAS database for the DAS cluster. However, this may make the system dependent on a database at the DAS as well as requiring administrating efforts to maintain the database.

With its own master key KM2, the DAS establishes a secure session with the device in the same way a secure session is established between the DMS and the device. This is represented in message flows 5-7 of FIG. 3.

In message flow 4, the DMS sends a credential or ticket to the device, for passing on to the DAS. This is done only after the DMS has verified that the device is an authorized device. This credential is signed with the DMS's private key. To ensure that the credential cannot be replayed by an adversary, a timestamp, a sequence number, or a combination of the two quantities, may be included in the credential. The details for signing the credential at the DMS and for verifying it at the DAS are not germane to the disclosure and are understood by those skilled in the art.

A question arises when the DAS initiates a connection to the device. This implies that the device would have no immediate connection with the DMS prior to the connection initiated by the DAS, and thus there would be no way for the DMS to transmit the device's credential to the DAS (through the device). This may be resolved by considering the following options:
a) Since the DAS initiates the connection, it may be assumed that it would already know whether the device is an authorized device prior to making the connection. This would be possible, for example, through the application's database.
b) To have a uniform design, may require the application at the DAS to have its own database to enable the DAS to determine the restrictions of the device. This may or may not allow for minimal or no local database at the DAS, depending upon whether the requirement applies only to the server (and not the application).

Configuration 1 as described may require more persistent storage than what a very low cost device can afford, to store device keys corresponding to the DASs. Also, some additional efforts may be required to configure and install these device keys on the device.

Figure 4:
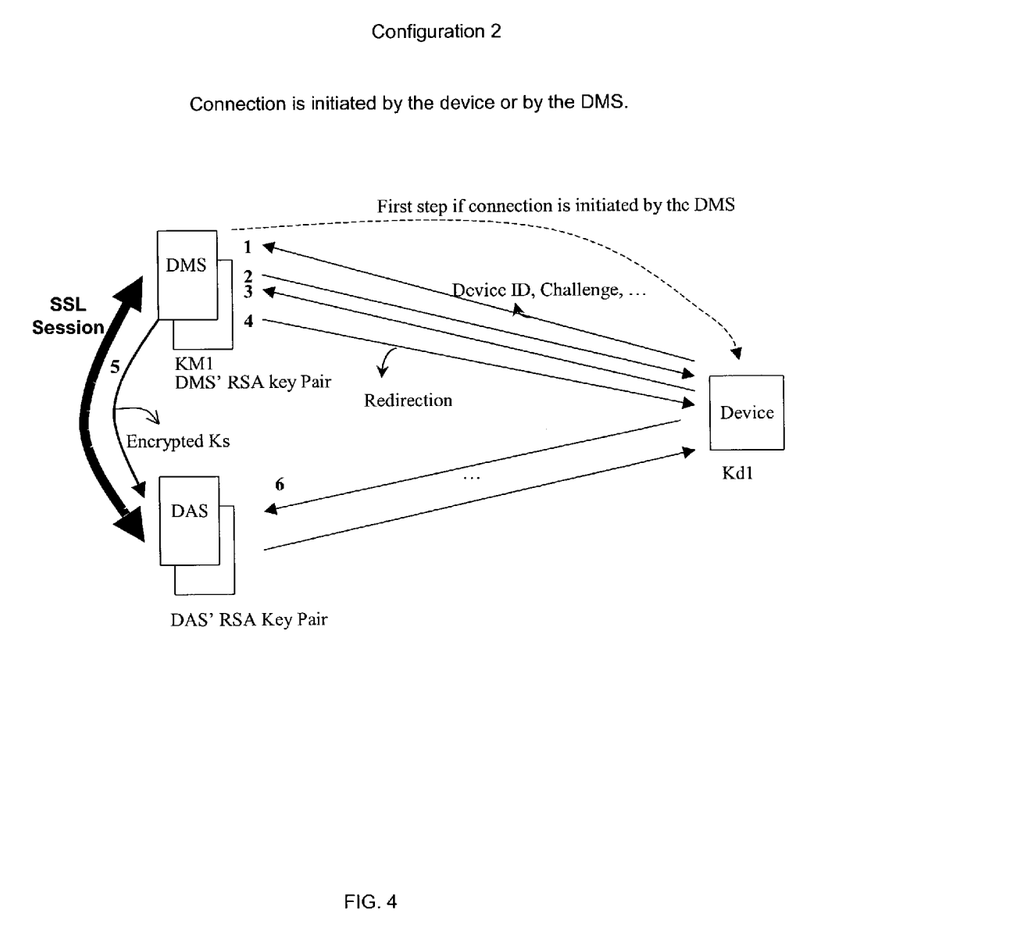

FIG. 4 illustrates one embodiment of the invention denoted as Configuration 2. Configuration 2, takes advantage of connectivity between the DMS and DAS being possible. As discussed above, with respect to FIG. 3, the DAS and the DMS may each possess their own public and private key pair (such as RSA). The DMS' public key certificate is distributed (or installed) on the DAS, and vice versa. However, unlike the embodiment illustrated in FIG. 3, the DAS does not have its own Master key for establishing a secure session with a device. Essentially, the DMS establishes a secure session with the device and both of them derive a session key Ks via a challenge-response process. Next, the DMS determines whether the device is an authorized device. If the device is authorized, the DMS establishes a SSL session with the DAS, and both of them derive a SSL session key Kssl. The DMS then encrypts Ks under the SSL session key and sends it to the DAS. Upon receiving the encrypted Ks, the DAS decrypts it and uses Ks to communicate with the device. This may require the device to recognize that, following a redirection from the DMS, the device continues to use the session key Ks when it connects to the DAS.

FIG. 4 shows the diagram of the connection, when it is initiated either by the device or by the DMS. As before, message flow 1-3 represents the challenge-response process between the DMS and the device. As may be seen, the communication between the device and the DAS does not include the challenge-response process. Message flow 5 is where the DMS sends the DAS the Session key Ks, encrypted under a SSL Session key.

Note that in this configuration, the DMS need not issue a credential/ticket for sending to the DAS. This is because, after the DMS verifies whether the device is authorized, it will not establish a SSL session with the DAS if the device is restricted. An adversary would not be able to replay a previously sent session key, as the SSL session produces a SSL session key that is presumably different each time.

From a practical standpoint, it may be best to implement a method to indicate whether the DMS establishes a SSL session with the DAS and sends over the session key Ks. Additionally, in this configuration, the DAS may not have the capability to redirect the device or send the session key Ks to another DAS.

FIG. 4 does not illustrate the situation when the connection is initiated by the DAS. In that situation, the following options may be considered:
a) The DAS connects to the DMS and requests the latter to connect to the device. The remaining sequence could be same as shown in FIG. 4.
b) The DAS connects to the device and the DMS. Upon receiving the challenge-response messages from the device, the DAS forwards them to the DMS, for the DMS to establish a secure session with the device (through the DAS) and establishes a session key Ks shared with the device. After the DMS verifies that the device is authorized, it establishes a SSL session with the DAS, and then transmits the session key Ks to the DAS, encrypted under the SSK session key. This may be done by either having the DAS mimic the device protocol to transmit the challenge/response to the DMS, or by allowing the DMS to establish a secure session with the device on behalf of the DAS.

Figure 5:
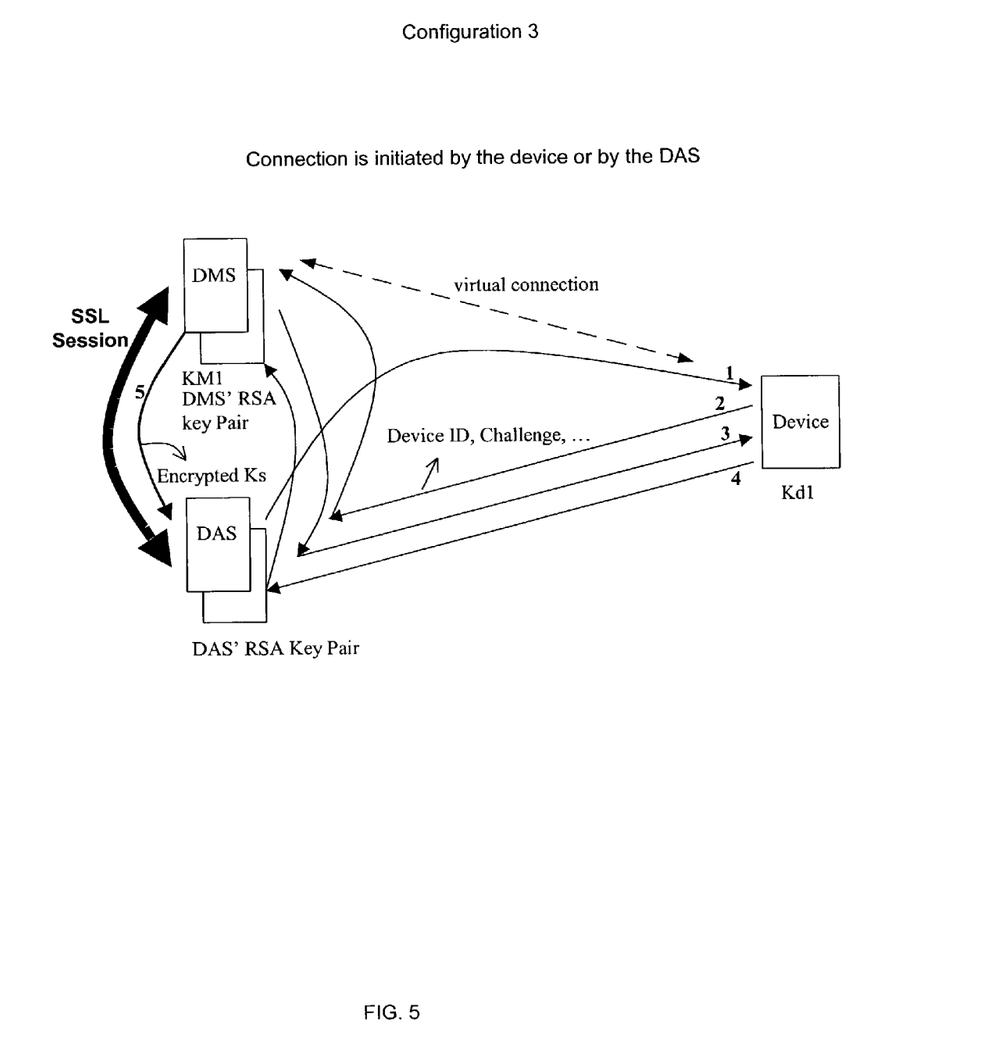

FIG. 5, an embodiment denoted as Configuration 3, illustrates the message flows when the DAS acts as an oracle, forwarding the challenge-response messages 2 to 4 between the DMS and the device. The device is not connected directly to the DMS. What is effectively established is a virtual connection from the device to the DMS.

Message flow 5 is where the DMS sends the DAS the Session key Ks, encrypted under a SSL Session key.

Figure 6:
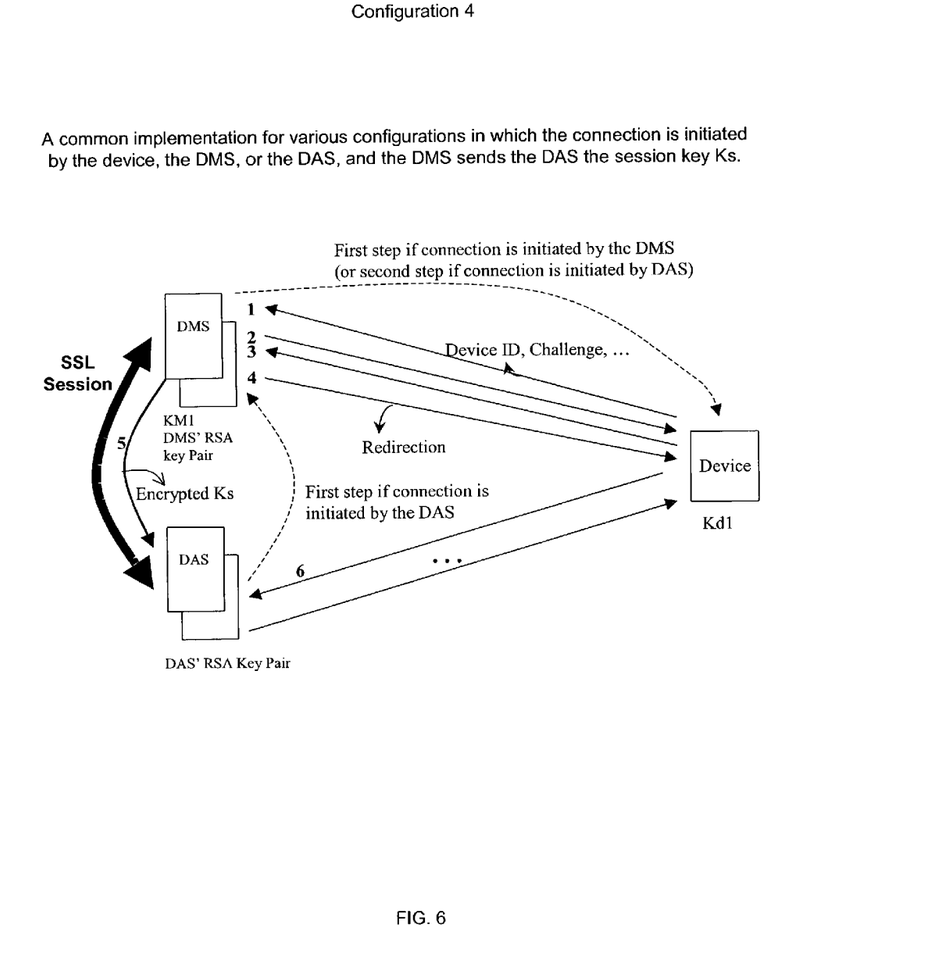

Another embodiment may combine features of Configuration 2 and 3. One such embodiment is illustrated in FIG. 6 denoted as Configuration 4.

Configuration 2 and Configuration 3 may have an advantage in that minimal local storage is required at the DAS. The DAS only needs to store its key pair (such as RSA), the DMS' public key certificate, and the public key of the certificate authority (CA), which can be either an industry-recognized CA, or a local CA designated by the service provider. Another advantage is the high degree of security that it offers: The Master key is maintained at the DMS; the DAS can only receive a session key, and only after the device is authenticated and validated by the DMS.

Figure 7:
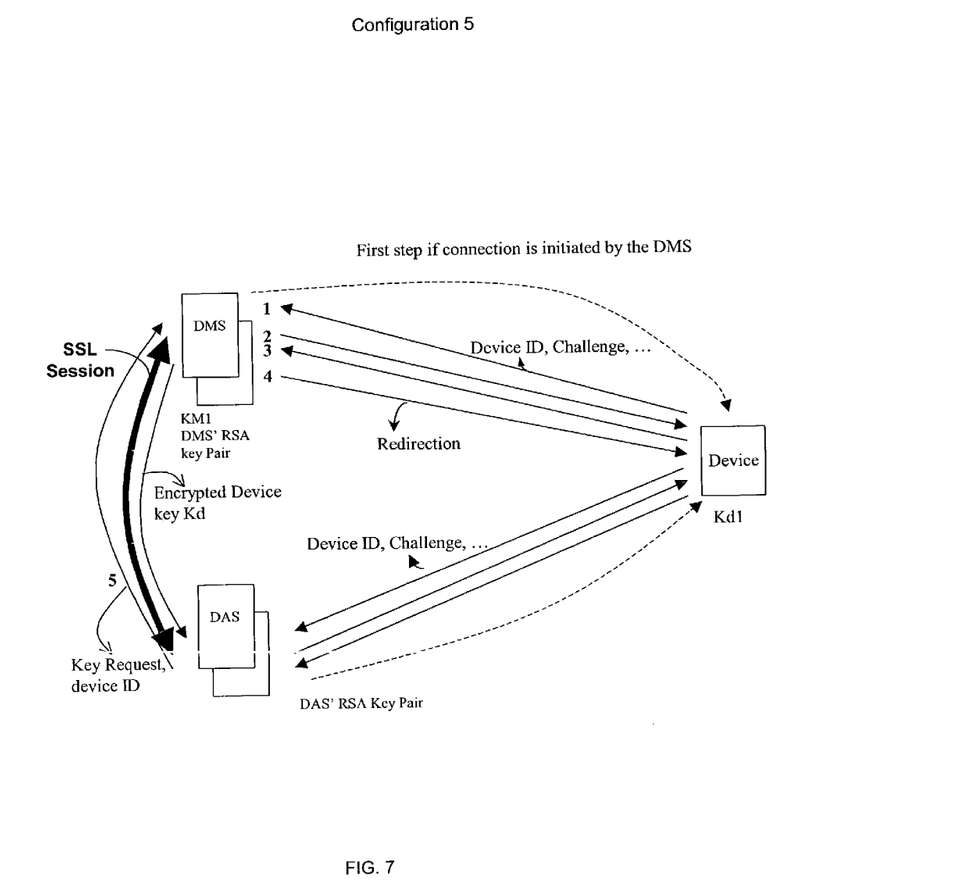

In another embodiment of the invention as illustrated in FIG. 7 denoted Configuration 5, instead of distributing the session key Ks (which the DMS establishes with the device) from the DMS to the DAS, the device key is distributed from the DMS to the DAS. Once the DAS obtains the device key, it can establish a secure session with the device, as in Configuration 1. The device key is destroyed by the DAS after the secure session with the device is over.

FIG. 7 illustrates one implementation for various configurations in which the connection is initiated by the device, the DMS, or the DAS. In this configuration, the challenge-response process happens whenever there is a connection between the device and the DMS, or between the device and the DAS, regardless of the whether the DAS has a database or not.

When the device initiates a connection to the DMS, the device and the DMS undergo a challenge-response process, as represented by flows 1 to 3. Next, the DMS verifies if the device is authorized. If the verification is successful, the DMS redirects the device to the DAS that contains the right application for servicing the device.

Upon a redirection, the device sends its ID and a cryptographic challenge to the DAS, which, in turn, issues a request to the DMS for the Device key. The device ID is transmitted along with this request. The DMS and the DAS then proceed to establish a SSL session. Next, the DMS verifies whether the device is an authorized device by checking the transmitted device ID against the list of device IDs in its database. If the device is authorized, the DMS derives the Device key, based on the Master key and the device ID, encrypting the Device key under the SSL session key, and sending it to the DAS. Note that in one implementation, the DMS may perform the checking on the device ID prior to establishing a SSL session with the DAS. In this case, if the device is restricted, the DMS does not establish the SSL session with the DAS and does not send the key.

Once the DAS obtains the encrypted device key, it decrypts the encrypted value to obtain the clear value of the device key. The DAS then uses the Device key to establish a secure session with the device.

If the DMS initiates the connection to a device, it sends the first message(s) to the device. Once the device accepts the connection, it communicates back with the DMS, and the process would be the same as in a device-initiated connection, from a cryptographic point of view. That is, the device establishes a secure session with the DMS; the DMS redirects the device to the DAS (if necessary); the device connects to the DAS; the DAS requests and obtains the Device key from the DMS via a SSL session; and the DAS establishes a secure session with the device.

When the connection to the device is initiated by the DAS, the device sends its device ID to the DAS and the challenge, if it accepts the connection. Upon receiving the device ID and the challenge, the DAS issues a request for a key to the DMS, sending along the device ID. The remaining steps are similar to before. That is, the DMS verifies whether the device is authorized, and establishes a SSL session with the DAS. If the device is authorized, the DMS derives and encrypts the Device key under the SSL session key, and then sends it to the DAS. The DAS uses the Device key to establish a secure session with the device.

Thus, a method and apparatus for key management for various device-server configurations has been described.

Figure 1:
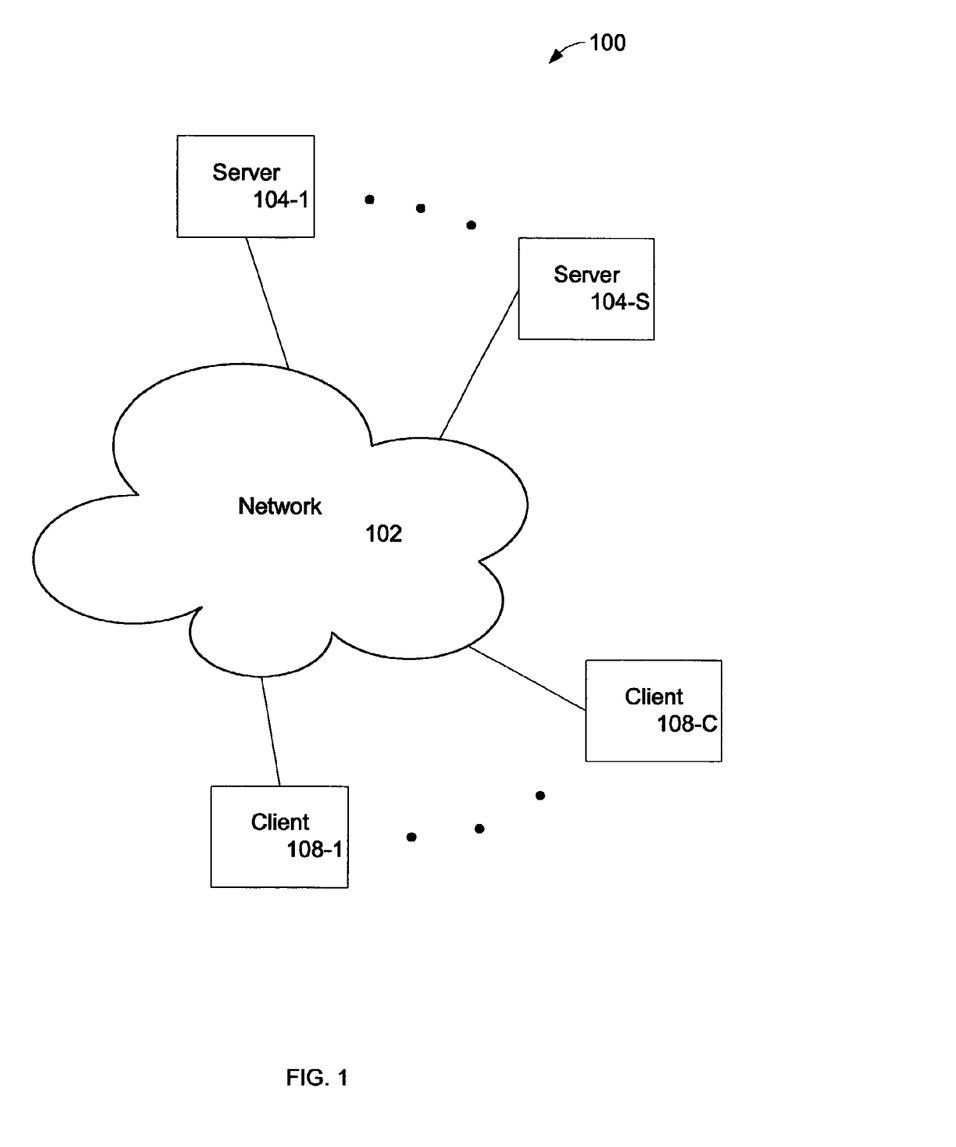
FIG. 1 illustrates a network environment in which the method and apparatus of the invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
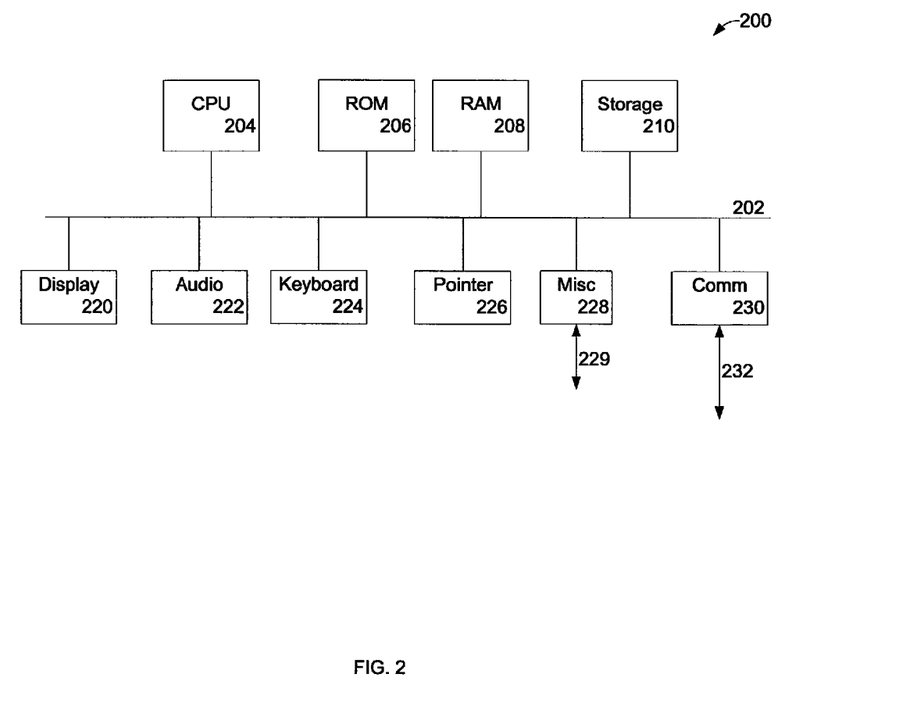
FIG. 2 is a block diagram of a computer system which may be used for implementing some embodiments of the invention.

FIG. 2 illustrates a computer system 200 in block diagram form, which may be representative of any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics, Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An "event" is understood by one skilled in the art and may be defined as transmitting information to/from one component to another, or for one component to call a method on another component. Upon reception an event may generates a state change in the receiving component, which by itself may change operation, program flow, etc. (for example, the UI presented to a user by the processing of a program or set of instructions).

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for key management for various device-server configurations have been described.

What is claimed is:

1. A method for establishing a connection, the method comprising in order:
   first, receiving at a device management server (DMS) an identification from a device; then
   second, deriving only at said DMS a first key based on said received identification from said device; then
   third, using said derived first key only at said DMS to authenticate said device; then
   fourth, when authenticated only at said DMS, then sending from said DMS to said device information selected from the group consisting of a credential, and a redirection signal; then
   fifth, sending from said DMS to said device a second key for use in all further communications between said DMS and said device; then
   sixth, establishing a secure socket layer (SSL) session between said DMS and a device application server (DAS); then
   seventh, sending to said DAS said second key; then
   eighth, using said second key at said DAS to authenticate said device; then
   ninth, when authenticated; and then
   tenth, sending a third key from said DAS to said device for use in communication between said DAS and said device.

2. A method comprising in order:
   first, receiving at a device a connection request from a first entity; then
   second, sending to said first entity a device identification after said received connection request; then
   third, receiving at said device from said first entity a first key; then
   fourth, using said received first key to authenticate only on said device said first entity; then
   fifth, when authenticated on said device; then
   sixth, receiving from said first entity a second key on said device for use in communication between said first entity and said device; then
   seventh when authenticated, then eighth receiving from said first entity information selected from the group consisting of a credential, and a redirection signal; then
   ninth, sending said identification and said credential from said device to a second entity; then
   tenth, receiving from said second entity a third key; then
   eleventh, using said third key to authenticate said second entity; then
   twelfth, when authenticated; and then
   thirteenth, receiving a fourth key for use in communication between said second entity and said device.

3. The method of claim 2 wherein said first entity, and said second entity are individually selected from the group consisting of a device management server (DMS), a device application server (DAS), a second device, and said device.

4. A method for establishing a secure communication link, the method comprising in order:
   first, receiving at a device application server (DAS) prior to establishing said secure communication link an identification from a device; then
   second, forwarding said received identification from said device at said DAS to a device management server (DMS) prior to establishing said secure communication link; then
   third, deriving only at said DMS a first key; then
   fourth, using said derived first key only at said DMS to authenticate said device prior to establishing said secure communication link; then
   fifth, when authenticated; then
   sixth, sending a second key from said DMS to said device for use in communication between said DMS and said device; then
   seventh, establishing said secure communication link between said DMS and said device using said sent second key; then
   eighth, establishing a secure socket layer (SSL) session between said DMS and said DAS; then
   ninth, sending to said DAS said second key; then
   tenth, using said second key at said DAS to authenticate said device; then
   eleventh, when authenticated; and then
   twelfth, sending a third key from said DAS to said device for use in communication between said DAS and said device.

5. A method for key management, the method comprising in order:
   first, receiving at a device management server (DMS) an identification from a device; then
   second, deriving only at said DMS a first key based on said received identification from said device; then
   third, using said derived first key only at said DMS to authenticate said device; then
   fourth, when authenticated only at said DMS sending a redirection signal from said DMS to said device; then
   fifth, sending from said DMS to said device a second key for use in all further communications between said DMS and said device; then
   sixth receiving at said DMS a device key from said device, said received device key completing said key management; then
   seventh, establishing a secure socket layer (SSL) session between said DMS and a device application server (DAS); then
   eighth, sending to said DAS said device key; then
   ninth, using said device key at said DAS to authenticate said device; then
   tenth, when authenticated; then
   eleventh, sending a key request from said DAS to said DMS; then
   twelfth, receiving at said DAS a third key from said DMS; and then
   thirteenth, sending said third key from said DAS to said device for use in communication between said DAS and said device.

* * * * *